Patented May 14, 1940

2,200,390

UNITED STATES PATENT OFFICE 2,200,390

PROCESSES OF EXTRACTING AND REFINING GLYCERIDES AND PRODUCTS RESULTING THEREFROM

Stephen Edward Freeman, Racine, Wis., assignor to Pittsburgh Plate Glass Company, Allegheny County, Pa., a corporation of Pennsylvania No Drawing. Application May 22, 1937, Serial No. 144,315

28 Claims. (Cl. 260—412.4)

The present invention relates to the treatment of oils, of the glyceride type, and it has particular relation to the treatment of glyceride oils such as linseed oil, oiticica oil, tung oil, soy-bean oil, cotton seed oil, hempseed oil, fish oil, and similar oils which are employed as film-forming constituents in paints, varnish, enamels, synthetic resins, and as food products, drug products and in soaps, plastics, etc.

One object of the invention is to separate an oil of the glyceride type into various fractions each or most of which will have greater value than the original oil when the fraction is suitably selected for use in paints, synthetic resins, food products, plastics, soaps, etc.

For example, the invention provides a simple and convenient method of separating oils comprising mixtures of glycerides of fatty acids of different degrees or types of unsaturation into fractions certain of which contain a higher ratio of the more unsaturated or more actively unsaturated components than the original mixture.

A second object of the invention is to provide a simple and convenient method of improving the rate of drying of oils.

A third object of the invention is to provide a method of removing "break" producing constituents from drying oils without subjecting the constituents or part of the oil to decomposition.

A fourth object of the invention is to provide a method of treating glyceride oils, the application of which results in the separation of a fraction of improved drying, kettle bodying and blowing characteristics and in which the tendency to form tacky films is substantially reduced or eliminated.

A fifth object of the invention is to provide a method of extracting such glyceride oils as linseed, soy-bean, cotton seed and similar oils from pulps or meals containing them, while leaving most of the phosphatides in a readily removable form in the meal.

A sixth object of the invention is to obtain a phosphatide suitable for use as an emulsifying and wetting agent, and as a source of valuable food and drug product.

A seventh object of the invention is to provide a simple and convenient method of separating free fatty acids, unsaponifiable material such as sterols and coloring matter from glyceride oils.

An eighth object of the invention is to provide a method of treating glyceride oils, the application of which results in the separation of a fraction of improved characteristics for hydrogenation and for food products.

These and other objects will be apparent from consideration of the following specification and the appended claims.

Oils of the glyceride type such as are employed in the preparation of foods, soaps, or as film-forming ingredients in many paints, varnishes and enamels are found in certain plants or in the seeds thereof, and as fatty constituents in the bodies of animals and fish, and are essentially different from petroleum or mineral oil, since they are composed mainly of mixtures of the glycerides of the fatty acids such as stearic, palmitic, oleic, linoleic, clupadonic, linolenic, licanic, elaeostearic, and many others. The principal difference between these glycerides consists in variation in the length of the carbon chains, and in the number and arrangement of the double bonds in the acid residues. For example, palmitic acid contains 16 carbon atoms while stearic acid contains 18 carbon atoms. Both are free of double bonds and are non-drying. Oleic acid contains a single double bond, but its glyceride is non-drying. Linoleic acid glycerides contain two non-conjugate double bonds and these bonds are of such activity that the glycerides possess drying properties. Linolenic acid supposedly contains 3 non-conjugate double bonds and its glyceride is a drying oil.

Elaeostearic acid and licanic acid, whose glycerides occur in tung oil and oiticica oil respectively contain double bonds in conjugate relationship in which they are extremely active, and their glycerides are the fastest drying of all.

These glycerides may be simple mono, di, or tri glycerides of one fatty acid, or they may contain compounds resulting from esterifying the OH groups of glycerol with two or three different acids. In addition to these principal constituents such oils contain small quantities of free fatty acids, phosphatides, vitamins, colored compounds, antioxidants and other compounds. Most of the components of the natural oils and the substances (meals or the like) containing the oils are of themselves of substantial value for various purposes. For example, the more highly unsaturated glycerides or the glycerides containing conjugate double bonds, which are more highly active than the more saturated glycerides, are useful as film-forming constituents in paints, varnishes, and lacquers. They are also useful as modifiers in resins. The saturated glycerides and the hydrogenated or unhydrogenated glycerides of a low degree of saturation are useful in foods and the like. The free acids of all types are useful in the preparation of resins, plastics and soaps and other important applications. The phosphatides are of value in foods, pharmaceutical preparations and as emulsifying agents, etc.

However, to admit of the application of these various components of natural oils, it is necessary or desirable at least partially to separate out the various constituents from the others. For example, in the case of drying oils used in the paint and varnish industries, the free acids cause objectionable acidity of the oil. Colored compounds, of course, impair the color of the oil and the films obtained therefrom. Antioxidants retard drying even in relatively highly unsaturated glycerides. Certain of the constituents probably including the phosphatides also produce the well known "break" or sludge formation which often attends heat treatment for purposes of improving the body, drying characteristic, etc., of oil. Glycerides of completely saturated or only slightly unsaturated acids if present in too large proportions are objectionable because they are non-drying and tend to produce slow drying, tacky films. Tackiness is a particularly objectionable feature in so-called marine oils, which will not satisfactorily harden even after months of exposure.

It is the object of refining processes for such oils to remove at least a part of certain of the constituents which for specific purposes are objectionable. For the paint and varnish industries it is particularly desirable to remove those portions which cause so-called "break" or sludge formation upon heating, and to remove excess free fatty acids, color and non-drying portions. The conventional method of refining these oils involves the application either of strong sulphuric acid which chars and coagulates the by-product portions, or treatment with sodium hydroxide. Both of these methods are drastic in their action upon the oil destroying some portions entirely, thus producing a by-product which has little or no value. In addition to causing destruction or degradation of the by-products, such treatment also tends to decompose a part of the drying, or film-forming glycerides. The methods are tedious and require considerable equipment and much space for storage purposes. Furthermore, the reagents employed in the process are not recoverable and along with the by-products which are obtained in a degraded form constitute a considerable source of loss.

The present invention is based upon the discovery of the selective solvent action of furan compounds such as furfural and derivatives thereof, such as furfuryl alcohol, under suitable conditions for certain components of vegetable or animal oils and seed meals or pulps containing them.

Furfural at suitable temperatures may be employed to dissolve and separate practically any of the glycerides of the fatty acids and the free acids themselves from meals and unrefined oil stocks to leave a residue which is very rich in phosphatides and other materials. Furthermore, by proper control of temperatures, and other factors such as moisture content, selective solvent action as between highly unsaturated glycerides, less highly unsaturated glycerides, free fatty acids and the like, may be obtained. By appropriate treatment of various oils such as linseed oil, hempseed oil, soy-bean oil, cotton seed oil, it is possible to separate a fraction which is very rich in unsaturates and may be used as a drying oil. The more highly saturated fraction either with or without hydrogenation may be employed as a food, soap stock or the like.

This fractionation may be varied by adding to the main solvent (such as furfural) a controlled quantity of phenol, pyridine, or other adjuvant for purposes of increasing the solvent action for some fraction of the oil without unduly impairing selectivity.

The treatment after fractionation may be varied by the addition of a controlled amount of ethyl or methyl or other suitable alcohol to the main solvent for the purpose of reducing or eliminating acidity or lecithin content.

Furfural exhibits the following characteristics which may be applied in the extraction and purification of such oils as linseed oil:

At temperatures above 104–6° F. it is an almost perfect solvent even in 1:1 ratio or greater for the main oil constituents including drying oil, saturated glycerides, free fatty acids, color components, etc. However, it dissolves the phosphatides only to a limited extent. Therefore, it may be employed while warm to extract linseed meal to leave an oil free cake which is rich in phosphorus compounds, and of exceptional value as a stock food.

At temperatures of about 104–106° F. its solvent powers for glycerides of relatively highly saturated acids and any residual phosphatides contained therein are greatly reduced and these tend to separate, leaving the drying oils, the free acids, coloring matter and sterols in solution. Extraction at these temperatures may be employed to separate the saturated glycerides and phosphatides from the raw oil.

Furfural containing dissolved water loses its solvent powers for unsaturated or drying glycerides, but retains most of the free fatty acids, sterols and most of the coloring matter. Therefore, the highly unsaturated glycerides may be separated from the latter by adding water to the solution of oil and furfural. If the saturated glycerides have been preliminarily removed a concentrated and relatively pure fraction of highly unsaturated glycerides may thus be obtained. If the saturated glycerides are not preliminarily removed a product containing them in admixture with the highly unsaturated glycerides results. The color and the acid value of the product are low.

Furfural and water may be removed from the residue of acids, sterol, coloring matter, etc., by distillation, to provide a product valuable for the manufacture of drugs, free fatty acids and similar materials.

In a specific example of the application of the invention raw linseed oil obtained by pressing linseed meal was extracted with furfural, a ratio of 2:1 (furfural to oil) being employed. This application was made in a single stage at a temperature of 106° F. The extracted oil was similar in color to raw linseed oil, but was found to be free from the usual tendency to "break." The raffinate oil was then further extracted with furfural in the ratio of two parts for one part of oil by counter-current extraction at a temperature of 77° F. A five per cent. extract was obtained which contained a slight amount of "break," but had drying properties and could be added to the original oil to produce a material which upon extraction at a higher temperature was free from break. The extracted oil constituting 95 per cent. of the original sample was free of "break" but was of a dark color. Upon treating it with furfural containing appreciable water e. g. by the addition of sufficient water to saturate the furfural-oil solution, a bleached oil practically free of acid and containing no "break" was obtained. The foregoing procedure may be modified by elimination of the preliminary treatment with furfural at 106° F.

By suitably regulating the proportion of furfural employed and the temperature of extraction the iodine value and drying characteristics of the oil may be varied, thus making it possible to obtain more desirable fractions even from oils which are initially of inferior quality.

As previously indicated furfural may be used directly upon crushed linseed meal as a solvent medium by heating it to a temperature of, or above, about 104° F. The oil dissolved in this manner contains the coloring matter together with a small amount of "break" producing fractions of phosphatides, sterols and free fatty acids, in addition to the glycerides of the oil. Upon cooling this solution to room temperature and adding water in amount sufficient to saturate the furfural, separation into two layers immediately occurs. The upper layer is composed chiefly of oil, together with a little solvent and a sludge-like material. The latter is easily removed therefrom by filtration or centrifugation. The sludge is found to contain phosphatides and seems to be responsible for the break produced in unrefined oil during heating. The lower layer obtained from the mixture above described contains the major portion of the solvent, together with the coloring matter, the free fatty acids, sterols, and a trace of glycerides. In the foregoing process a slow speed centrifuge may be employed to separate the two liquid phases. However, settling for a few days also accomplishes the same purpose. The pale "break" free neutral oil, upon treatment with a bleaching earth, was obtained as a product comparable in color to the best grades of varnish oil. The fraction contained in the furfural solvent after separation of the desired oil was a highly concentrated dark colored mixture of free fatty acids, sterols, and other unidentified compounds.

During the linseed oil extraction a viscous substance consisting mainly of a phosphatide containing 10.25 per cent. of phosphorus expressed as $P_2O_5$ was separated. The iodine value thereof was 91.5 and the saponification value 225. It contained only a very small amount of nitrogen thus differing from a true lecithin. The material was initially soluble in naphtha and insoluble in acetone and was of a waxy appearance similar to soy-bean lecithin. It was insoluble in hot alcohol. Upon exposure to air it dried in a few days to a brittle powder insoluble in all solvents.

Residual furfural in the oil may be stripped by steam or vacuum distillation at any temperature up to 300 or 400° F. High temperature treatment should not be too prolonged or polymerization of the oil will result.

Linseed meal extracted with furfural is found to contain much more of the ordinary phosphorus compounds than meal which has been extracted in ordinary manner. For example, a meal which was extracted with petroleum ether in accordance with conventional procedure until it contained 1 per cent. of oil was found to contain 1.2 per cent. of phosphorus expressed as $P_2O_3$. In contradistinction meal extracted with furfural to the 1 per cent. oil content was found to contain 2.2 per cent. of phosphorus compounds. These phosphorus compounds are lost during refining of the oil by ordinary methods. Since they are highly valuble for food purposes their retention in the meal obviously enhances the value of the latter for stock foods and similar preparations, or they may be removed in a relatively pure state with other solvents such as petroleum ether.

The free fatty acids as obtained from the furfural solution contained 3 or 4 per cent. of unsaponifiable material probably sterols, and a small amount of glycerides and tar-like material. The acids can be easily removed from the product by vacuum distillation and command a price even slightly above that for the refined oil.

The phosphatides, or lecithin-like ingredients obtained in the sludge initially separated from the oil may be used as emulsifying agents and wetting agents particularly in paints and in the preparation of drugs and food products.

If instead of linseed oil the above principles of solvent fractionation be applied to other glyceride oils such as soy-bean, hempseed, fish oil, cotton seed oil, etc. the critical temperature of miscibility will be found to vary.

For example with soy-bean oil the critical furfural miscibility temperature (using 2 parts furfural to 1 part oil) is about 122° F.

It has also been found that in the treatment of glyceride oils containing lecithins (for example soy-bean oil) that the lecithins will be dissolved by the main solvent (such as furfural) and that they may be separated later by additions of water or alcohols to the furfural oil solution.

Furfural may likewise be employed in the extraction of various other drying oils including fish oils. These oils are characterized by the fact that they normally exhibit a pronounced tack, even after they have been dried for a relatively long time. This "tack" is easily noticeable when they are exposed to wet weather. The method employed is generally similar to that employed in connection with linseed oil. By such treatment the tack producing ingredients in the oil seem to be separated out, and an oil is obtained having even better drying characteristics than linseed oil. The improvement in drying properties is demonstrated by the fact that the portion of oil, extracted by furfural, is of substantially higher iodine value than the original oil. The acid value of the extract oil is also substantially lower. The acid value may be reduced practically to zero by further treating the oil with alcohol (either ethyl or methyl). The original oil may also be extracted with a mixture of furfural and an adjuvant such as phenol which is found to increase the solubility of the oil. A mixture of 75 per cent. of furfural and 25 per cent. of phenol is found to produce good results. When ordinary fish oil is treated with such mixture, a fraction is obtained as a product having good drying properties and improved color. The fraction thus extracted constitutes 70 per cent. of the oil. Upon addition of water to the extracted solution and lowering of the temperature to about 68° F. separation of the oil becomes substantially complete. The free fatty acids of the oil remain dissolved in the furfural phenol water mixture. This is also true of at least a portion of the coloring matter.

Marine oils, which normally produce tacky films, when treated with solvents in accordance with the provisions of the present invention, do not show any break even when heated to upward of 600° F. and they dry faster than linseed oil. The films produced by them are non-tacky, free of fishy odor and are highly resistant to blistering.

Other drying oils such as hempseed oil, soybean oil, perilla oil, etc., may be treated with furfural, or furfuryl alcohol, or the like, in order to obtain refined fractions if so desired.

Soy-bean oil can be successfully fractionated to produce from a high grade crude having an iodine value of 145, an oil 67 per cent. by weight of the original having an iodine value of 152. This oil dries in about one hour more time than a linseed oil of 176 iodine value. The residue dries to act as fast if not faster than the original indicating the removal of an antioxidant. The film of the residual portion is softer than the original oil while the extract fraction is quite hard being somewhat superior in this respect to raw linseed oil. It greatly resembles the film produced by perilla oil. The residual fraction having an iodine value of 135 may be used as a drying oil, but in view of its refined nature and low iodine number it should be of more value for hydrogenation. A great quantity of whole soy-bean oil is now being used for this purpose and the solvent product should be superior for the purpose.

Kettle bodying tests, in which the kind and distribution of the glycerides is of most importance with the presence of antioxidants being of secondary if of any meaning, were made. These tests showed a most remarkable behavior for the solvent soy-bean oil. In 5 hours the viscosity increased enormously to produce a gel-free, but very viscous oil similar to a litho-oil. Such high body can be secured in considerably less time than is needed to produce an equal body from alkali refined linseed oil.

Soy-bean oil may be extracted from soy-bean meal at a temperature above 122° F. When the oil and furfural mixture is treated with water, separation of true soy-bean lecithin as a sludge occurs.

In the case of tung oil, oiticica oil and similar oils which consist largely of glycerides of such acids as elaeostearic and licanic acid, which contain conjugate double bonds, no practical separation by furfural extraction is possible without the addition of a suitable diluent. Accordingly, in order to obtain good fractionation, the oil should be diluted with 3 or 4 volumes of a paraffinic hydrocarbon such as hexane, or other diluent which will dissolve the oils but form a two phase system with furfural. Upon addition of furfural to this system, the glycerides containing conjugate double bonds are dissolved out, leaving the unsaturated and non-conjugate glycerides in the hexane. By appropriate methods the fractions may be recovered.

Similarly, highly unsaturated fractions or fractions which are highly active by reason of the presence of conjugate double bonds may be recovered from other oils of the types herein enumerated by preliminarily adding a paraffinic solvent such as hexane and then adding furfural to effect fractionation, into two layers, one of which consists primarily of furfural and the more actively unsaturated glycerides and the other of which consists primarily of hydrocarbon solvent and the saturated or less actively unsaturated hydrocarbon.

Oils treated in accordance with the provisions of the invention are usually of relatively low color and may be used without bleaching. However, if still lighter colors are required, they may be further bleached by conventional methods.

In event that an oil is of lower acidity than desired, its acid number may be substantially increased by incorporation of a small amount of the free fatty acids.

The phosphatides in controlled amounts may likewise be of value in certain types of oils. For example, linseed oil refined with caustic by conventional methods does not wet pigments such as titanium dioxide adequately. If a small amount (e. g., 3%) of these phosphatides are added to such oils, this characteristic is greatly improved.

The furfural employed in the processes constituting the subject matter of the present application is relatively inexpensive to obtain. Its volatility is low and fire hazards involved in its use are slight. Risks due to toxicity of the materials are also slight and by any reasonable precaution can be avoided.

Fractions of the oil eminently suited for use in paints, varnishes, etc., are obtained. At the same time, highly valuable by-products result. Although only the preferred forms of the invention have been described, it will be apparent to those skilled in the art that numerous modifications may be made therein without departure from the spirit of the invention, or the scope of the appended claims.

What I claim is:

1. A method of separating glyceride oils of a class consisting of linseed, soya bean, fish, perilla and cottonseed oil from materials containing them which comprises extracting the material with a furan compound selected from the group consisting of furfural and furfuryl alcohol at a temperature not substantially below 104° F. to obtain a solution of oil in the compound, then cooling the solution to effect separation of highly saturated glycerides as a liquid phase, separating the two liquid phases and removing the furan compound therefrom.

2. A method as defined in claim 1 in which the furan compound is furfural.

3. A method as defined in claim 1 in which the material is flaxseed meal.

4. A method as defined in claim 1 in which the material is soy-bean meal.

5. A method of extracting glyceride oils containing non-conjugate double bonds from seed meals containing them, that comprises extracting the meals with furfural then removing the furfural from the resultant solution.

6. A method as defined in claim 5 in which the meal treated is soy-bean meal.

7. A method as defined in claim 5 in which the meal treated is flaxseed meal.

8. A process of treating seed meals containing glycerides of fatty acids containing non-conjugate double bonds which comprises contacting the meal with furfural to remove at least a part of the glycerides, distilling off the furfural with steam, condensing the steam and furfural.

9. A method of separating glycerides of fatty acids into fractions, one of which contains a large number of relatively active non-conjugate groupings and another of which contains a lesser number of such groupings which comprises treating the mixture of glycerides with a furan compound selected from a group consists of furfural and furfuryl alcohol at a temperature not substantially below 77° F. to dissolve selectively the glycerides containing the more active groupings, removing the solution containing active glycerides as a liquid phase from a liquid fraction of the more saturated glycerides, then removing the furan compound from the solution.

10. A method as defined in claim 9 in which the furan compound is furfural.

11. A method as defined in claim 9 in which the more active groupings are those more highly unsaturated than the lesser active groupings which are more nearly saturated.

12. A method of separating glycerides of fatty acids into fractions, one of which contains a large number of relatively unsaturated valence bonds and another of which contains a lesser number of such valence bonds which comprises treating the mixture of glycerides with furfural at a temperature below about 104° F. to dissolve the glycerides containing the more highly unsaturated valence bonds, separating the solution and then removing the furfural by adding water to leave a fraction which is rich in highly unsaturated glycerides and which is relatively free of fatty acids.

13. A method as defined in claim 9 in which the more active groupings are conjugated double bonds; the lesser active being non-conjugated double bonds.

14. A process of separating mixtures of glycerides of fatty acids a portion of which are unsaturated into fractions, one of which is more highly active than the original material, which comprises treating the material with furfural, and then adding water to the furfural-glyceride solution to cause separation of the dissolved oil.

15. A method of treating glycerides of fatty acids some of which are relatively unsaturated and some of which are more completely saturated, which comprises treating the oil with a paraffinic hydrocarbon solvent, then treating the resultant solution with a furan compound selected from a group consisting of furfural and furfuryl alcohol to separate a fraction which is rich in the more unsaturated glycerides, then adding water to the fraction to effect separation of the dissolved glycerides.

16. A method as defined in claim 15 in which the furan compound is furfural.

17. A method as defined in claim 15 in which some of the glycerides contain conjugate double bonds.

18. A method as defined in claim 15 in which the furan compound is furfural and some of the glycerides contain conjugate double bonds.

19. A method of improving the drying characteristics of oils containing glycerides of unsaturated fatty acids which comprises extracting the oils with furfural at a temperature sufficient to dissolve a substantial part of the glycerides, then adding water to the solution and removing the furfural from the separated oil.

20. A method as defined in claim 19 in which the oil is fish oil.

21. A method as defined in claim 19 in which the oil is soy-bean oil.

22. A method as defined in claim 19 in which the oil is linseed oil.

23. A process of treating a material selected from a class consisting of seed meals, crude oils extracted from such meals and fish oils, said material containing a fraction of a glyceride of a higher fatty acid which is relatively completely saturated and a fraction of a glyceride of a fatty acid which is relatively incompletely unsaturated, which comprises treating the material with furfural at a temperature at or above that of substantially complete miscibility of the glycerides contained in the material with furfural, the temperature being not substantially below 104° F., then cooling the solution to effect separation of a fraction of relatively highly saturated glycerides, removing the fraction from the remaining solution of relatively highly unsaturated glycerides, free fatty acids and furfural, then adding water to the solution to effect separation of a fraction which is rich in relatively highly unsaturated glycerides and removing the latter fraction.

24. A process of extracting a fraction relatively rich in unsaturated glyceride oil containing non-conjugate double bonds from a material containing said glyceride oil in admixture with a more completely saturated glyceride oil which comprises extracting the mixture with furfural at a temperature between about 77° F. and 104° F., then separating the resulting mixture into layers one of which consists mainly of furfural and oil which is rich in unsaturated glycerides, then separating the layers and removing the furfural from the oil dissolved therein.

25. A process of treating natural glyceride oil from a class consisting of soya bean, linseed, perilla, cottonseed and fish oil, said oil comprising glyceryl esters of higher fatty acids, a portion of said esters being capable of drying and a portion being non-drying, in order to separate the oil into two fractions, one of which dries substantially better, and the other of which dries substantially poorer than the original oil, which process comprises contacting the oil with a furan compound as a selective solvent, said compound being from a class consisting of furfural and furfuryl alcohol, the temperature being that at which the particular oil separates into two liquid phases, one comprising the solvent with the unsaturated glyceride dissolved therein, separating the two liquid phases from each other and then removing the solvent from the phase containing the unsaturated glycerides to obtain said portion of oil of superior drying characteristics.

26. A process of treating natural glyceride oil from a class consisting of soya bean, linseed, perilla, cottonseed and fish oil, said oil comprising glyceryl esters of higher fatty acids, a portion of said esters being capable of drying and a portion being non-drying, in order to separate the oil into two fractions, one of which dries substantially better and the other of which dries substantially poorer than the original oil, which process comprises contacting the oil with a furan compound as a solvent, said compound being from a class consisting of furfural and furfuryl alcohol, the temperature being that at which the particular oil separates into two liquid phases, one comprising the solvent with the unsaturated glyceride dissolved therein, separating the two liquid phases from each other and then distilling off the solvent from the phase containing the unsaturated glycerides to obtain said portion of oil of superior drying characteristics.

27. A process of treating natural glyceride oil from a class consisting of soya bean, linseed, perilla, cottonseed and fish oil, said oil comprising glyceryl esters of higher fatty acids, a portion of said esters being capable of drying and a portion being non-drying, in order to separate the oil into two fractions, one of which dries substantially better and the other of which dries substantially poorer than the original oil, which process comprises contacting the oil with a furan compound as a solvent, said compound being from a class consisting of furfural and furfuryl alcohol, the temperature of contact being that at which the particular oil separates into two liquid phases, one comprising the solvent with the unsaturated glyceride dissolved therein and being within a range of about 77 to 122° F., separating the two liquid phases from each other and then removing the solvent from the phase containing the unsaturated glycerides to obtain said portion of superior drying characteristics.

28. A process of treating natural glyceride oil from a class consisting of soya bean, linseed, perilla, cottonseed and fish oil, said oil comprising glyceryl esters of higher fatty acids, a portion of said esters being capable of drying and a portion being non-drying, in order to separate the oil into two fractions, one of which dries substantially better, and the other of which dries substantially poorer than the original oil, which process comprises contacting the oil with a furan compound as a solvent, said compound being from a class consisting of furfural and furfuryl alcohol, the temperature of contact being that at which the particular oil separates into two liquid phases, one comprising the solvent with the unsaturated glyceride dissolved therein and being within a range of about 77 to 122° F., separating the two liquid phases from each other and then distilling the solvent from the phase containing the unsaturated glycerides to obtain said portion of superior drying characteristics.

STEPHEN EDWARD FREEMAN.